United States Patent
Curtis

(10) Patent No.: US 10,103,659 B2
(45) Date of Patent: Oct. 16, 2018

(54) STEPPER TRAJECTORY DRIVER WITH NUMERICAL CONTROLLED OSCILLATORS OPERATED AT FREQUENCY PROVIDED BY A SYNCHRONIZED CLOCK SIGNAL

(71) Applicant: Microchip Technology Incorporated, Chandler, AZ (US)

(72) Inventor: Keith Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/370,971

(22) Filed: Dec. 6, 2016

(65) Prior Publication Data

US 2017/0163190 A1 Jun. 8, 2017

Related U.S. Application Data

(60) Provisional application No. 62/264,188, filed on Dec. 7, 2015.

(51) Int. Cl.
  *G05B 19/40* (2006.01)
  *H02P 8/14* (2006.01)
  *H02P 8/34* (2006.01)
  *H02P 8/40* (2006.01)

(52) U.S. Cl.
  CPC ............... *H02P 8/14* (2013.01); *G05B 19/40* (2013.01); *H02P 8/34* (2013.01); *H02P 8/40* (2013.01); *G05B 2219/41272* (2013.01); *G05B 2219/41326* (2013.01); *G05B 2219/42181* (2013.01); *G05B 2219/43083* (2013.01)

(58) Field of Classification Search
  CPC .......... G05B 19/40; G05B 2219/41272; G05B 2219/41326; G05B 2219/42181; G05B 2219/43083; H02P 8/40
  See application file for complete search history.

(56) References Cited

U.S. PATENT DOCUMENTS

| 4,109,187 A * | 8/1978 | Steinberg ........... G05B 19/4103 318/570 |
| 6,230,078 B1 * | 5/2001 | Ruff .................... G05B 19/0426 700/247 |
| 2010/0141200 A1 * | 6/2010 | Tsubota ................... H02P 8/34 318/696 |

OTHER PUBLICATIONS

Dalvi, Namrata, "TB3131: Numerically Controlled Oscillator on PIC® Microcontrollers," Microchip Technology Incorporated, 8 pages, Jan. 27, 2015.
Goldberg, Kenneth et al., "XY Interpolation Algorithms," Robotics Age, URL: http://goldberg.berkeley.edu/pubs/XY-Interpolation-Algorithms.pdf, pp. 22-25, Jun. 30, 1983.
Skanda, Vinaya, "AN1523: Sine Wave Generator Using Numerically Controlled Oscillator Module," Microchip Technology Incorporated, URL: http://ww1.microchip.com/downloads/en/AppNotes/00001523A.pdf, 22 pages, Jan. 1, 2013.

(Continued)

*Primary Examiner* — Muhammad S Islam
(74) *Attorney, Agent, or Firm* — Slayden Grubert Beard PLLC

(57) ABSTRACT

A stepper control circuit includes numerical controlled oscillators configured to provide step signals for multiple axes of stepper motor movement. The numerical controlled oscillators are configured to be operated at a same frequency provided by a synchronized clock signal.

16 Claims, 2 Drawing Sheets

(56) References Cited

OTHER PUBLICATIONS

Feng, Qian et al., "FPGA-Based Acceleration and Deceleration Control for CNC Machine Tools," Conference Proceedings of the Institute of Electrical and Electronics Engineers, pp. 210-214, Dec. 1, 2013.
Anonymous, "Steppers with Encoders: When Open-Loop Control Isn't Enough," Phidgets, URL: https://phidgets.wordpress.com/2014/05/13/steppers-with-encoders-when-open-loopcontrol-isnt-enough/, 10 pages, May 13, 2014.
International Search Report and Written Opinion, Application No. PCT/US2016/065261, 18 pages, dated Jul. 3, 2017.

* cited by examiner

STEPPER TRAJECTORY DRIVER WITH NUMERICAL CONTROLLED OSCILLATORS OPERATED AT FREQUENCY PROVIDED BY A SYNCHRONIZED CLOCK SIGNAL

RELATED PATENT APPLICATION

This application claims priority to commonly owned U.S. Provisional Patent Application No. 62/264,188; filed Dec. 7, 2015; which is hereby incorporated by reference herein for all purposes.

TECHNICAL FIELD

The present disclosure relates to control systems, and, in particular, to stepper motor control.

BACKGROUND

Microcontrollers are often used to control stepper motors in a computer numeric control (CNC) system. CNC systems are often controlled using software. Control is performed in one dimension by selecting an axis. Movement along the axis is performed by accelerating, deaccelerating, or simply operating a stepper motor. Control of one dimensional motion may implemented by selecting the axis of motion and accelerating motion, running in constant motion, or decelerating motion. Two-dimensional motion requires such selections in two dimensions in addition to a calculation of coincident steps.

SUMMARY

Embodiments of the present disclosure include a stepper control circuit. The circuit includes a first numerical controlled oscillator configured to provide step signals for a first axis of stepper motor movement. The circuit includes a second numerical controlled oscillator configured to provide step signals for a second axis of stepper motor movement. The first and second numerical controlled oscillators are configured to be operated at a same frequency provided by a synchronized clock signal.

Embodiments a method for controlling a motor stepper includes providing step signals for a first axis of stepper motor movement by a first numerical controlled oscillator. The method includes providing step signals for a second axis of stepper motor movement by a second numerical controlled oscillator. Control of the first and second numerical controlled oscillators is performed

DETAILED DESCRIPTION

Figure 1:
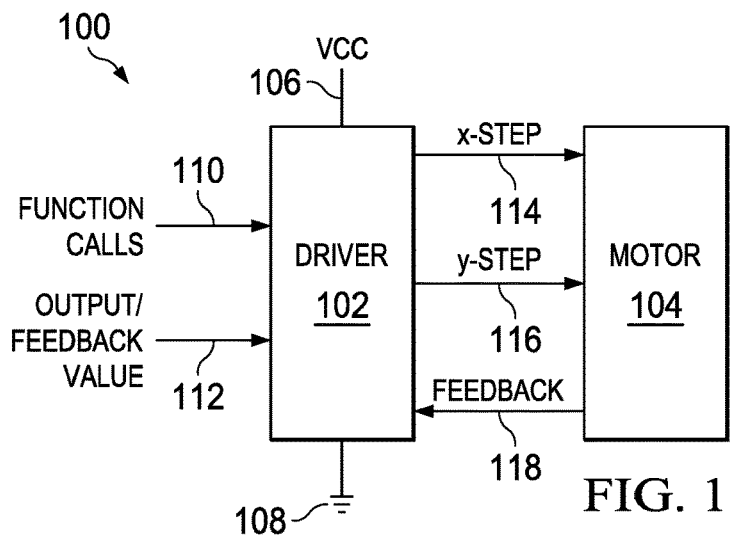
FIG. 1 illustrates an example of a system for control of a stepper motor through a driver, in accordance with embodiments of the present disclosure.

FIG. 1 illustrates an example of a system 100 for control of a stepper motor through a driver, in accordance with embodiments of the present disclosure. System 100 may implement a CNC system. For example, system 100 may control the movement of a motor 104 through a driver 102. In the example of FIG. 1, motor 104 and driver 102 are illustrated as operating in an X-direction and a Y-direction. However, motor 104 and driver 102 may be configured to perform control in any suitable number of dimensions, such as three dimensions.

In one embodiment, motor 104 may be implemented as an electric stepper motor. Motor 104 may accelerate, deaccelerate, or move with linear speed in any suitable dimension, such as the X-, Y-, and Z-directions. Motor 104 may respond to control inputs received from driver 102.

Driver 102 may be implemented by any suitable combination of analog and digital circuitry. In one embodiment, driver 102 may be implemented by a combination of numerically controlled oscillators (NCO) and counters. In another embodiment, driver 102 may be implemented as part of a microcontroller, such as an eight-bit microcontroller. In yet another embodiment, driver 102 may be communicatively coupled to elements of an eight-bit microcontroller elsewhere in system 100 (not shown). In still yet another embodiment, driver 102 may be communicatively coupled to a hardware processor executing instructions in a computer-readable medium elsewhere in system 100 (not shown). Driver 102 may be powered by a voltage source 106 and grounded 108.

In some embodiments, driver 102 may receive control signals from elsewhere in system 100 that specify positions to which motor 104 is to move. The control signals may be of the form, for example, of function calls 110. Driver 102 may be configured to translate, interpret, or otherwise implement such function calls 110 into actual control signals or movement of motor 104. Such control of motor 104 may be performed with step-signals for each dimension of movement that is to be performed. For example, based upon received function calls 110 and the interpretation thereof, driver 102 may issue a series of x-step signals 114 and y-step signals 116 to motor 104. The series of x-step signals 114 and y-step signals 116 may specify speed, acceleration, or deacceleration of motor 104 in relevant axes. In some embodiments, driver 102 may receive feedback signals 118 from motor 104 indicating the state of operation of motor 104.

Figure 3:
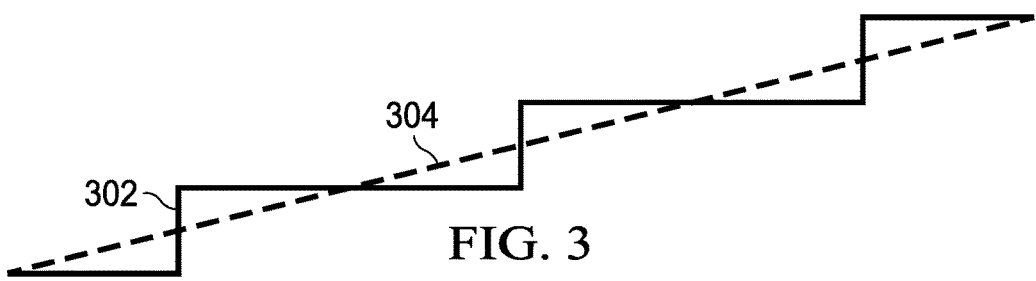
FIG. 3 shows a typical non-linearity of a two-dimensional movement using, for example, a software calculation solution.

Execution of movement in a single direction by motor 104 may require relatively simple calculation by driver 102. Simultaneous execution of movement in multiple directions by motor 104 may require further calculation of coincident steps by driver 102. For example, to move linearly along a straight two-dimensional line, driver 102 must determine relative speeds, accelerations, and deaccelerations for each dimension in relation to the other dimension. Fractional differences between the X- and Y-distances, along with the granularity of the processing power of system 100, may cause non-linearities in the output performance of motor 104. Such non-linearities are illustrated in FIG. 3, wherein an expected linear performance may in fact be implemented by a stair-stepped output of motor 104.

Returning to FIG. 1, furthermore, software executing in system 100 may have to take into account and intervene for off-axis steps, wherein delays for each step may have to be calculated and inserted during execution to successfully perform acceleration, deacceleration, and constant velocity movement. However, such software processing may be mathematically intensive and beyond the reach of, for example, eight-bit microcontrollers controlling driver 102 and motor 104.

According to various embodiments, driver 102 may be implemented with one or more numerically control oscillators (NCO). In one embodiment, driver 102 may include an NCO for each axis of control. Each NCO may be implemented by any combination of suitable analog or digital circuitry. For example, an NCO may be implemented by a combination of multiplexers, adders, flip-flops or latches, ripple counters, and digital logic. The NCO may be implemented in part by an NCO peripheral in microcontrollers available from Microchip, Inc. The NCO may utilize a direct digital synthesis (DDS) technique to generate waveforms. The NCO may operate by repeatedly adding a fixed value to an accumulator. The accumulation may be performed with a carry operation. The remainder value may be left in the accumulator after an overflow. The overflow may act as the raw NCO output. The NCO may thus function as a timer that uses the overflow of the accumulator therein to divide the input frequency and create an output signal.

NCOs in driver 102 may be used to generate step output to stepper motor controls in motor 104. By using NCOs, the real-time trajectory calculations for a CNC linear move by driver 102 and motor 104 may be eliminated by using variable frequency control capability of the NCO. In one embodiment, driver 102 may include a counter configured to count how many moves have been made along a given axis. Using such a move completion counter, driver 102 may disable the NCO after sufficient steps have been completed. For example, the NCO may be set with a constant addition value, such as one, five, or one hundred. Each clock cycle, the counter of the NCO may be incremented by the constant value. When the capacity of the counter is reached, the addition of the constant value may cause an overflow. The NCO may be configured to generate an output pulse or step motion for motor 104 based upon the overflow. Accordingly, the rate of motion for an axis of movement may be configured by setting the constant addition value for the corresponding NCO in view of the clock speed and counter size. The constant value may be maintained throughout a programmed movement. Accordingly, rather than constantly or continuously calculating instant acceleration, deceleration, speed values for each axis and correlating them, driver 102 may set the values and parameters of the respective NCOs and allow them to operate. In one embodiment, driver 102 may calculate a programmable prescaler value for each separate NCO. The relative value of the prescaler values will in turn cause acceleration and deceleration in a coordinated manner.

In applications such as three-dimensional printing, the system may allow an extruder to move at a speed proportional to the actual movement of the depositor head. For example, when X and Y movements are made at a forty-five degree angle, the depositor head has to move 1.414 times the X and Y movements to extrude sufficient plastic to cover the distance.

Figure 2:
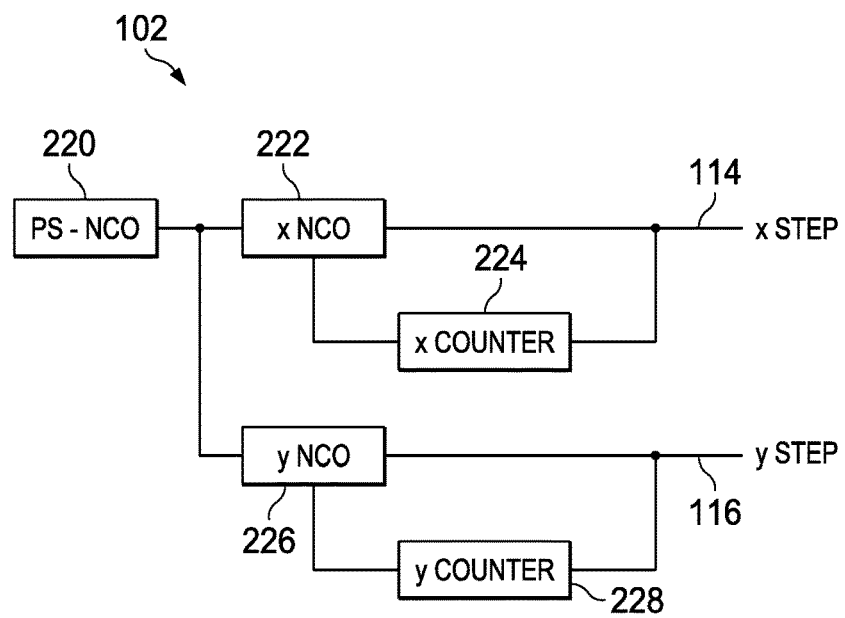
FIG. 2 illustrates an embodiment of a driver, according to embodiments of the present disclosure.

FIG. 2 illustrates an embodiment of driver 102, according to embodiments of the present disclosure. Driver 102 may include a prescaler NCO 220 whose output is communicatively coupled to an x-axis NCO 222 and a y-axis NCO 226. In embodiments where more axes are controlled with system 100, the output of prescaler NCO 220 would be similarly routed to additional NCOs for respective axes of control. Furthermore, each NCO may be associated with a respective counter for each respective axis of control. For example, driver 102 may include an x-counter 224 and a y-counter 228. The combination of respective NCOs and counters may yield x-step 114 and y-step 116 outputs.

NCOs 222, 226 may be tied to a common clock. Accordingly, changes to prescaler values applied to NCOs 222, 226 may change at the same rate with respect to the other NCO. The common clock may be increased or decreased in frequency to accelerate or deaccelerate. However, by using a common clock between NCOs 222, 226, no further coordination must be made between NCOs 222, 226 during acceleration and deacceleration (or, by extension, during linear movement). In contrast, other motor drivers, such as software-based solutions, may require determining relative time delays for each of the x-step 114 and y-step 116 outputs.

For example, presume that driver 102 is to cause movement of motor 104 in a 30° angle. The ratio of movement in the x-direction and y-direction is thus to be (0.5:0.866). Accordingly, prescaler NCO 220 may generate a scalar addition value for x-direction NCO 222 and different scalar addition value for y-direction that cause generation of x-step 114 pulses and y-step 116 pulses at a ratio of (0.5:0.866). NCO 222 will roll over through its counter more often than NCO 226 (and its respective counter) so as to maintain the specified ratio. For example, out of every one hundred possible pulses, x-direction NCO 222 will generate fifty pulses and y-direction NCO 226 will generate eighty-six pulses. Operating together on the same clock, NCOs 222, 226 will move at a thirty-degree angle. NCOs 222, 226 will move until the requisite number of steps have been made as defined in counters 224, 228.

In one embodiment, motor 104 must be accelerated to a specified velocity of the movement. To accelerate to the specified velocity (and subsequently deaccelerate at the end of the move segment) the clock frequency as applied to both NCOs 222, 226 may be increased or decreased. However, even as such operation and subsequent movement of motor 104 is accelerated or deaccelerated, no further calculation of respective delays between x-steps 115 and y-steps 116 needs to be performed for the 30° angle movement. The clock frequency as applied to NCOs 222, 226 may thus be varied and ramped or down as needed to accelerate and deaccelerate to a specified velocity.

A subsequent movement of a different angle may be performed by calculation of new constant values by prescaler NCO 220 and subsequent operation of NCOs 222, 226. Passing of values for prescalers and constant addition values may be performed, for example, by writing output of NCO 220 to registers associated with NCOs 222, 226.

Furthermore, the synchronized movement of NCOs 222, 226 may eliminate problems from howling of motor 104. Motor 104 may perform best at a constant speed. However, due to calculation rounding error presented in other solutions, pulses for x-step 114 and y-step 116 might be generated at slightly different times, causing jerking of the motor for brief moments in time. In contrast, pulses, when generated by NCOs, are issued cleanly along clock periods. Thus, variance in pulses is eliminated allowing the armature of motor 104 to run without howling.

Calculations and determinations of how many steps to move, scalar constants, counter values, relative ratios, and frequencies may be performed by prescaler NCO 220. In one embodiment, prescaler NCO 220 may access look-up tables stored in memory to determine values of scalar constants.

FIG. 3 shows a typical non-linearity 302 of a two-dimensional movement using, for example, a software calculation solution. As can be seen in this 2-dimensional movement, two x-steps are followed by one y-step followed by four x-steps, another single y-step, four more x-steps, a single y-step, and two final x-steps.

In other systems, such as those based on software, the dimension with the higher number of steps may be used as a base and steps in the other dimensions are derived. For example, in the thirty degree example, the requisite number of y-steps are sent to motor 104 and the associated number of x-steps are calculated according to the ratio (0.5:0.866). However, in many microcontrollers there is insufficient processing power to perform all these calculations (along with delay calculations).

The nonlinearities shown in FIG. 3 may also arise wherein a divisor used to create relative movement of x-steps and y-steps leaves a remainder. In such a case, movement in one direction may stop before movement in the other direction stops. To combat such non-linearity, an NCO for an axis that otherwise stops short of terminating movement may be preloaded with one-half of the remainder difference arising from the divisor. By pre-loading one-half of the remainder, a flat spot at the end of the trace may be reduced in half and a corresponding flat spot caused at the beginning of the trace of movement.

Figure 4:
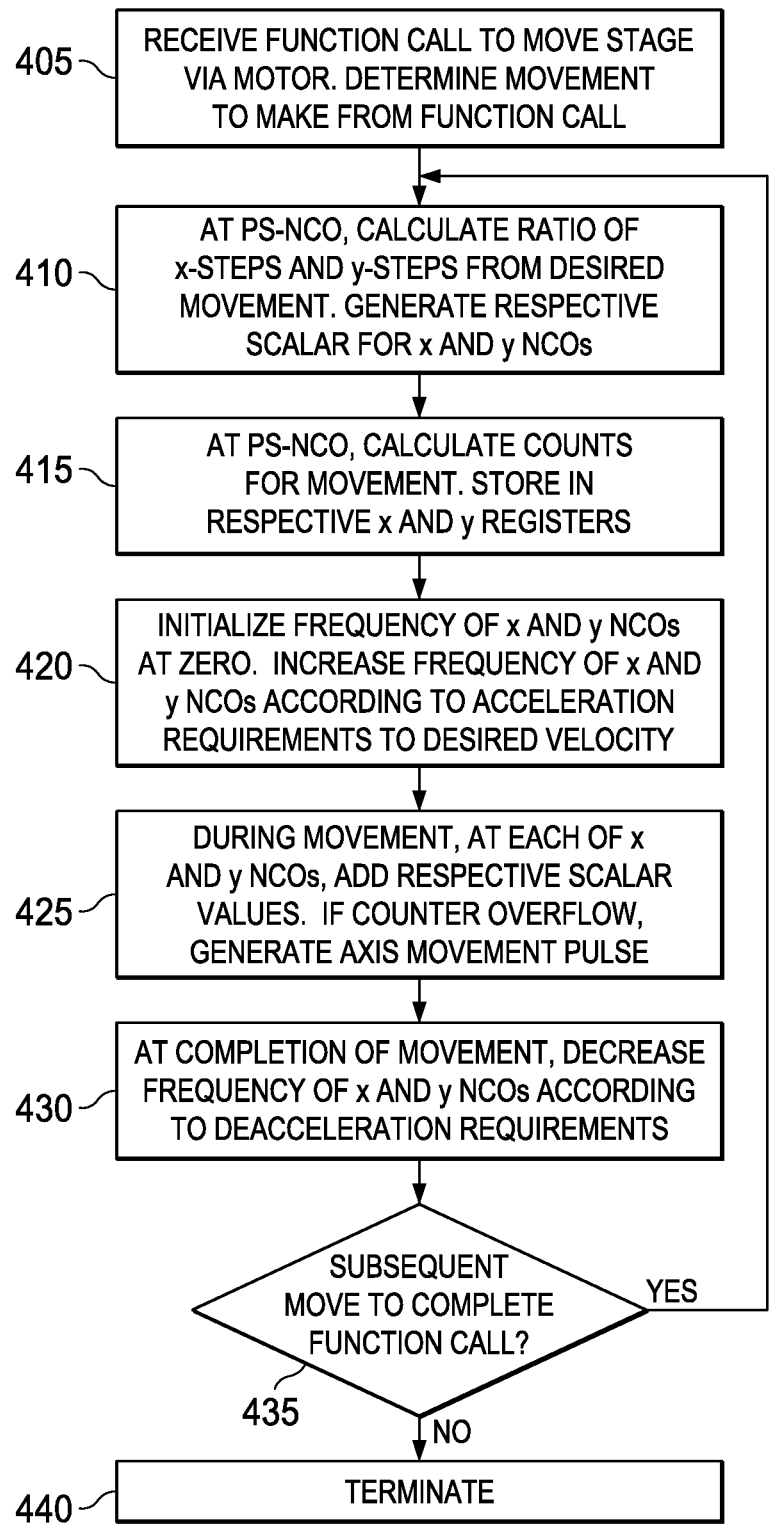
FIG. 4 illustrates an example method for operation of a stepper motor driver, according to embodiments of the present disclosure.

FIG. 4 illustrates an example method 400 for operating a stepper motor driver, according to embodiments of the present disclosure.

At 405, a stepper driver may receive a function call or other request to move a stage or other mechanism associated with a stepper motor. The movement that is to be performed may be determined from the function call. The movement may have several components that are to be performed in sequential order.

At 410, at a prescaler NCO in the driver, a calculation of the number of x-steps and y-steps (and other dimensions, as applicable) may be performed. The calculation may be made by, for example, accessing a lookup table using the desired angle of movement. A relative number of x-steps and y-steps may be determined. Furthermore, acceleration, deacceleration, and velocity requirements may be determined. A scalar value may be determined for each respective NCO associated with different axes of movement.

At 415, at the prescaler NCO, counts for the movement may be determined based upon the desired distances of the move. The counts may be stored in respective registers.

At 420, frequency of operation of respective axis NCOs (for example, in the x and y directions may be initialized. For example, the frequency may be set to zero initialization. The frequency of each NCO may be tied together. The frequency of each NCO may be increased, simultaneously through a shared clock, according to the required acceleration until the target velocity is reached. The frequency thereafter may be held constant.

At 425, during movement of the motor, at each of the axis NCOs, the determined scalar values may be added to a counter within the NCO. If the counter overflows, the respective NCO may generate a movement pulse for the respective axis.

At 430, as the movement nears completion, the operational frequency of the axis NCOs may be decreased according to deacceleration requirements.

At 435, it may be determined whether a subsequent move is needed to complete the function call. If so, method 400 may return to, for example, 410. Otherwise, method 400 may terminate.

Method 400 may be implemented by any suitable mechanism, such as by system 100 and the elements of one or more of FIGS. 1-2. Method 400 may optionally repeat or terminate at any suitable point. Moreover, although a certain number of steps are illustrated to implement method 400, the steps of method 400 may be optionally repeated, performed in parallel or recursively with one another, omitted, or otherwise modified as needed. Method 400 may initiate at any suitable point, such as at 405.

Although example embodiments have been described above, other variations and embodiments may be made from this disclosure without departing from the spirit and scope of these embodiments.

The invention claimed is:

1. A stepper motor control circuit comprising:
    a first numerical controlled oscillator configured to provide step signals for a first axis of stepper motor movement;
    a second numerical controlled oscillator configured to provide step signals for a second axis of stepper motor movement; and
    a prescaler oscillator configured to offset operation of the first numerical controlled oscillator by one half of a remainder difference of a divisor, the divisor including a ratio between a first count of steps to be performed by the first numerical controlled oscillator and a second count of steps to be performed by the second numerical controlled oscillator;
    wherein the first and second numerical controlled oscillators are configured to be operated at a same frequency provided by a synchronized clock signal.

2. The stepper motor control circuit of claim 1, further comprising a first counter configured to receive control signals for the first axis of stepper motor movement and a second counter configured to receive control signals for the second axis of stepper motor movement.

3. The stepper motor control circuit of claim 1, wherein the prescaler oscillator is further configured to set the same frequency of the first and second numerical controlled oscillators.

4. The stepper motor control circuit of claim 1, wherein the prescaler oscillator is further configured to set a first constant value of the first numerical controlled oscillator, the first constant value configured to set a rate of pulse generation of the first numerical controlled oscillator.

5. The stepper motor control circuit of claim 1, wherein the prescaler oscillator is further configured to set a first constant value of the first numerical controlled oscillator, the first numerical controlled oscillator configured to repeatedly add the first constant value to a counter to set a rate of pulse generation of the first numerical controlled oscillator.

6. The stepper motor control circuit of claim 1, wherein the prescaler oscillator is further configured to set a first constant value of the first numerical controlled oscillator, the first numerical controlled oscillator configured to repeatedly add the first constant value to a counter and generate a motor pulse upon overflow of the counter to set a rate of pulse generation of the first numerical controlled oscillator.

7. The stepper motor control circuit of claim 1, wherein the prescaler oscillator is further configured to accelerate movement of a motor by increasing frequency of operation of the first and second numerical controlled oscillators simultaneously.

8. The stepper motor control circuit of claim 1, further comprising a third numerical controlled oscillator configured to provide step signals for a third axis of stepper motor movement, wherein the first, second, and third numerical controlled oscillators are configured to be operated at the same frequency.

9. A method for controlling a stepper motor, comprising:
    providing step signals for a first axis of stepper motor movement by a first numerical controlled oscillator; providing step signals for a second axis of stepper motor movement by a second numerical controlled oscillator; and offsetting operation of the first numerical controlled oscillator by one half of a remainder of a difference of a divisor, the divisor including ratio between a first count of steps to be performed by the first numerical controlled oscillator and a second count of steps to be performed by the second numerical controlled oscillator;

wherein control of the first and second numerical controlled oscillators is performed at a same frequency by a synchronized clock signal.

10. The method of claim 9, further comprising receiving control signals for the first axis of stepper motor movement and control signals for the second axis of stepper motor movement into respective counters.

11. The method of claim 9, further setting the same frequency of the first and second numerical controlled oscillators.

12. The method of claim 9, further comprising setting a first constant value of the first numerical controlled oscillator, the first constant value configured to set a rate of pulse generation of the first numerical controlled oscillator.

13. The method of claim 9, further comprising setting a first constant value of the first numerical controlled oscillator, the first numerical controlled oscillator configured to repeatedly add the first constant value to a counter to set a rate of pulse generation of the first numerical controlled oscillator.

14. The method of claim 9, further comprising setting a first constant value of the first numerical controlled oscillator, the first numerical controlled oscillator configured to repeatedly add the first constant value to a counter and generate a motor pulse upon an overflow of the counter to set a rate of pulse generation of the first numerical controlled oscillator.

15. The method of claim 9, further comprising accelerating movement of a motor by increasing frequency of operation of the first and second numerical controlled oscillators simultaneously.

16. The method of claim 9, further comprising providing step signals for a third axis of stepper motor movement by a third numerical controlled oscillator, wherein the first, second, and third numerical controlled oscillators are operated at the same frequency.

\* \* \* \* \*